United States Patent
Murayama et al.

(10) Patent No.: US 6,671,290 B1
(45) Date of Patent: Dec. 30, 2003

(54) RECEIVING APPARATUS AND RECORDING/REPRODUCING SYSTEM FOR DIGITAL BROADCASTS

(75) Inventors: Naoki Murayama, Tokyo (JP); Iwao Yamamoto, Tokyo (JP); Tatsuya Wakahara, Tokyo (JP); Hajime Inoue, Chiba (JP); Ichiro Hamada, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/433,432

(22) Filed: Nov. 4, 1999

(30) Foreign Application Priority Data

Nov. 10, 1998 (JP) .......................................... P10-319624

(51) Int. Cl.$^7$ .................................................. H04J 1/00
(52) U.S. Cl. ........................ 370/486; 370/535; 348/405
(58) Field of Search ................................ 370/486, 477, 370/349, 389, 390, 485, 487, 488, 489, 490, 535–544; 725/151, 153, 152, 131–134, 88, 89; 386/52, 55; 348/7, 423, 405, 554

(56) References Cited

U.S. PATENT DOCUMENTS

| | | | |
|---|---|---|---|
| 5,899,578 A | | 5/1999 | Yanagihara et al. |
| 5,909,257 A | * | 6/1999 | Ohishi et al. ............. 348/726 |
| 5,959,659 A | * | 9/1999 | Dokic ......................... 348/7 |
| 6,137,486 A | * | 10/2000 | Yoshida et al. ............ 345/327 |
| 6,253,019 B1 | | 6/2001 | Yanagihara et al. |
| 6,285,824 B1 | | 9/2001 | Yanagihara et al. |
| 6,445,872 B1 | * | 9/2002 | Sano et al. ................. 386/46 |
| 6,467,093 B1 | * | 10/2002 | Inoue et al. ............... 725/151 |
| 6,477,317 B1 | * | 11/2002 | Itokawa ..................... 386/95 |
| 6,496,896 B1 | * | 12/2002 | Inoue ........................ 710/306 |

FOREIGN PATENT DOCUMENTS

| | | |
|---|---|---|
| EP | 0 785 675 A2 | 7/1997 |
| EP | 0 893 913 A1 | 1/1999 |
| WO | WO97/46007 | 12/1997 |

* cited by examiner

*Primary Examiner*—Chi Pham
*Assistant Examiner*—Alexander O. Boakye
(74) *Attorney, Agent, or Firm*—Lerner, David, Littenberg, Krumholz & Mentlik, LLP

(57) ABSTRACT

An apparatus for receiving a digital broadcast signal includes a tuner operable to select a desired transmission channel over which to receive the digital broadcast signal and demodulate a transport stream which is transmitted over the selected transmission channel. The receiving apparatus also includes a demultiplexer operable to extract a desired program from the demodulated transport stream; an interface operable to transmit the demodulated transport stream to, and receive a reproduced transport stream from, a reproducing apparatus; and a discriminator operable to determine whether the reproduced transport stream contains a multiplexed plurality of programs. A predetermined process is performed on the reproduced transport stream when the discriminator determines that the reproduced transport stream contains the multiplexed plurality of programs.

21 Claims, 6 Drawing Sheets

RECEIVING APPARATUS AND RECORDING/REPRODUCING SYSTEM FOR DIGITAL BROADCASTS

BACKGROUND OF THE INVENTION

1. Field of the Invention

The invention relates to a receiving apparatus of a digital satellite broadcast which is used in a receiving and recording/reproducing system of a digital satellite broadcast such that a signal in which video data and audio data are broadcast by a transport stream of an MPEG (Moving Picture Experts Group) 2 system is received and the transport stream is recorded/reproduced to/from a recording medium such as digital video tape, optical disk, magnetic disk, or the like. The invention also relates to a processing method of the reproduced transport stream.

2. Description of the Related Art

In recent years, the spread of IEEE1394 has been started as a digital interface to transfer video data and audio data between digital video equipment and digital audio equipment at a high speed. In IEEE1394, an isochronous transfer mode and an asynchronous transfer mode are supported. In the isochronous transfer mode, a delay time of transmission is guaranteed and it is suitable for use in high speed transfer of a time-sequential data stream such as video data or audio data. In the asynchronous transfer mode, it is guaranteed to certainly transmit data to a node of a partner destination and it is suitable for use in the case of certainly transfer data such as a command or the like.

In recent years, the spread of digital satellite broadcasting has been started. In the digital satellite broadcast, digital video data and audio data are compressed and packetized and transmitted by the transport stream of the MPEG2 system. A packet identifier called a PID is provided in a header of a transmission packet. Video packets and audio packets of a plurality of programs are multiplexed to the same stream and transmitted.

When such a digital satellite broadcast is received, a decoder for receiving the digital satellite broadcast called an IRD (Integrated Receiver Decoder) is connected to a television receiver. A signal of the digital satellite broadcast received by a parabolic antenna is supplied to the IRD. In the IRD, the transport stream of MPEG2 is demodulated, a video packet and an audio packet of a desired program are extracted from the transport stream of MPEG2 by the PID, and a video signal and an audio signal are decoded from the video packet and audio packet. The video signal and audio signal are supplied from the IRD to the television receiver.

To receive such a digital satellite broadcast, a construction such that the digital interface of IEEE1394 is provided for the IRD has been proposed. If the digital interface of IEEE1394 is provided for the IRD, the IRD and equipment such as a recording/reproducing apparatus or the like are connected and a receiving and recording/reproducing system of the digital satellite broadcast can be constructed. If such a system is constructed, the transport stream of MPEG2 transmitted by the digital satellite broadcast can be recorded/reproduced as it is.

That is, upon recording, the transport stream of MPEG2 received on the IRD side is sent to the recording/reproducing equipment through the digital interface of IEEE1394. The transport stream of MPEG2 is recorded as it is onto a recording medium by the recording/reproducing equipment. Upon reproduction, the transport stream of MPEG2 is reproduced from the recording medium. The reproduced transport stream of MPEG2 is transmitted to the IRD through the digital interface of IEEE1394. The transport stream of MPEG2 is decoded by the IRD.

As mentioned above, if the digital interface of IEEE1394 is provided for the IRD and the IRD and the recording/reproducing equipment are connected and the receiving and recording/reproducing system of the digital satellite broadcast is constructed, the transport stream of MPEG2 transmitted by the digital satellite broadcast can be recorded/reproduced as it is to/from a recording medium such as digital video tape, optical disk, magnetic disk, or the like.

In the digital satellite broadcast, packets of a plurality of programs have been multiplexed to the same carrier frequency and transmitted. Two systems may be considered, in the case where the transport stream of MPEG2 transmitted by the digital satellite broadcast is recorded/reproduced to/from the recording medium such as a tape cassette or the like as mentioned above. One is a single program recording system in which the video packet and audio packet of one desired program are extracted on the IRD side and sent to the digital recording/reproducing equipment and recorded. The other is a multiprogram recording system in which the video packets and audio packets of a plurality of programs transmitted by one carrier frequency are sent from the IRD to the digital recording/reproducing apparatus and recorded as they are.

The multiprogram recording system has an advantage in that a plurality of programs can be simultaneously recorded. Upon reproduction, however, processes for selecting a desired program from the packets of a plurality of programs and extracting the video packet and audio packet of the program are necessary, the user may become confused, and the processes are complicated. A program of the digital satellite broadcast is scrambled on the basis of the reception contract. If the multiprogram recording system is used, there is a possibility that the reception contract is not protected. Therefore, in the current IRD, a method of generally using the single program recording system is considered.

However, the multiprogram recording system has an advantage in that a plurality of programs can be simultaneously recorded. Further, when considering the realization of future multichannel scenarios, there is a high probability such that the multiprogram recording system will be used in an IRD in future.

If the IRD which supports the multiprogram recording as mentioned above is put on the market in the future, the recording medium recorded by the multiprogram recording system and the recording medium recorded by the single program recording system will both exist in the marketplace. There is, consequently, a possibility that the recording medium recorded by the multiprogram recording system is loaded into the recording/reproducing apparatus connected to the IRD which does not support with the multiprogram recording system via the IEEE1394 and is reproduced. If the transport stream of the multiprogram recording system is sent to the IRD which does not support the multiprogram recording system as mentioned above, it cannot be correctly reproduced and the user may become confused.

SUMMARY OF THE INVENTION

It is, therefore, an object of the invention to provide a receiving apparatus of a digital broadcast which can discriminate whether a reproduced transport stream is based on a multiprogram recording system or a single program recording system and can perform a proper process in accordance with a discrimination result about whether it is based on the multiprogram recording system or single program recording system.

According to the invention, when a transport stream of MPEG2 from a recording/reproducing apparatus is reproduced, whether the transmitted transport stream of MPEG2 is based on a single program recording system or a multiprogram recording system is discriminated in an IRD. In case of the transport stream of the multiprogram recording system, a video packet and an audio packet of a program of the smallest program number among a plurality of programs are extracted and decoded. In case of the transport stream of the multiprogram recording system, the transport stream is not decoded but a video image and audio sound can be further muted or a warning indicating that they cannot be reproduced can be displayed. Thus, even if a tape cassette recorded by the multiprogram recording system is loaded into a digital video cassette recording/reproducing apparatus and the transport stream of MPEG2 is inputted to the IRD which does not support the multiprogram recording system upon reproduction, the user is not confused.

The above and other objects and features of the present invention will become apparent from the following detailed description and the appended claims with reference to the accompanying drawings.

DETAILED DESCRIPTION OF THE PREFERRED EMBODIMENTS

Figure 1:
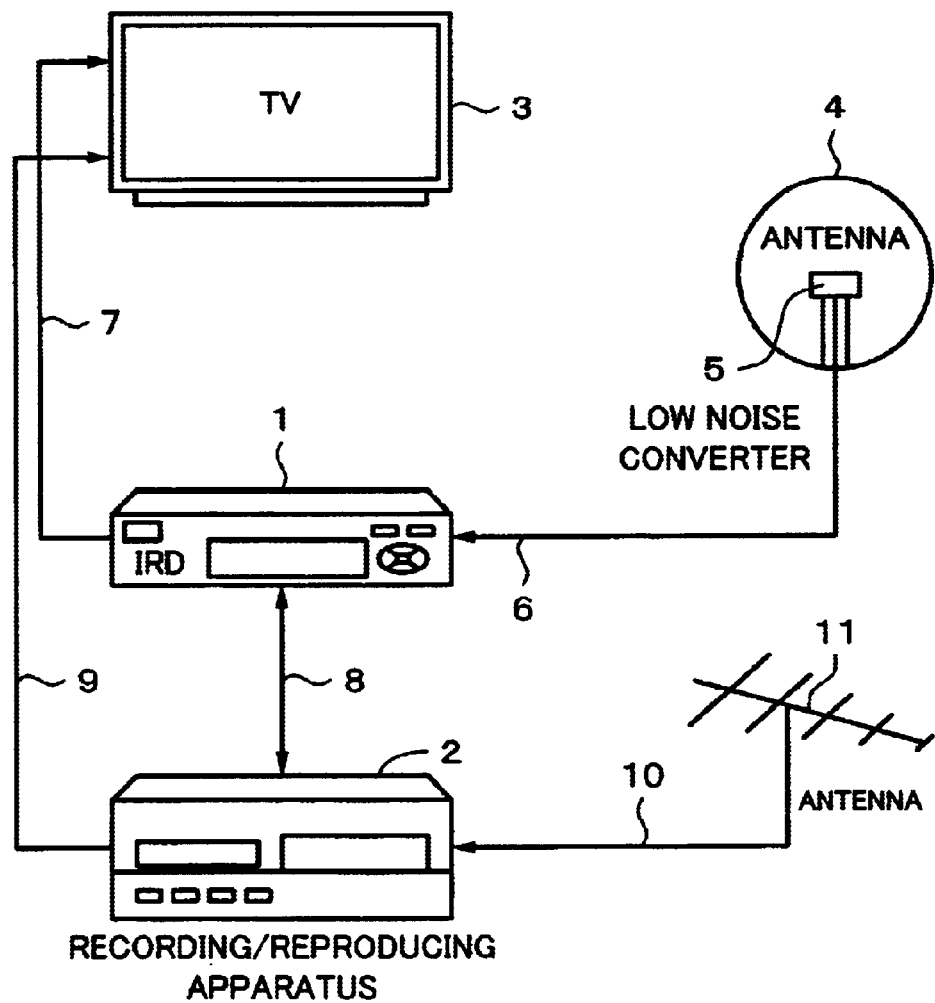
FIG. 1 is a block diagram of an example of a receiving and recording/reproducing system of a digital satellite broadcast to which the invention is applied.

An embodiment of the invention will now be described hereinbelow with reference to the drawings. FIG. 1 shows a receiving and recording/reproducing system of a digital satellite broadcast to which the invention is applied.

In FIG. 1, reference numeral 1 denotes an IRD; 2 a digital video cassette recording/reproducing apparatus; and 3 a television receiver. A receiving and recording/reproducing system of a digital satellite broadcast is constructed by the IRD 1, digital video cassette recording/reproducing apparatus 2, and television receiver 3. The IRD 1 and digital video cassette recording/reproducing apparatus 2 have a digital interface of IEEE1394. The IRD 1 and digital video cassette recording/reproducing apparatus 2 are connected through a cable 8 of the digital interface of IEEE1394.

The IRD 1 decodes a reception signal of the digital satellite broadcast and forms a video signal and an audio signal of, for example, the NTSC system. An antenna terminal of the IRD 1 is connected through a cable 6 to a low noise converter 5 attached to a parabolic antenna 4. A radio wave from the satellite is transmitted in a band of, for example, 12 GHz. The radio wave from the satellite is received by the parabolic antenna 4 and converted into a signal of a band of, for example, 1 GHz by the low noise converter 5 attached to the parabolic antenna 4.

An output of the low noise converter 5 is supplied to an antenna terminal of the IRD 1 through the cable 6. A signal of a desired carrier wave is selected from the reception signal and a transport stream of MPEG2 is demodulated in the IRD 1. A video packet and an audio packet of a desired program are extracted from the transport stream. A decoding process of the video packet and audio packet is performed and the video signal and audio signal of, for example, the NTSC system are decoded.

A video output terminal and an audio output terminal of the IRD 1 are connected to a video input terminal and an audio input terminal of the television receiver 3 through a cable 7. The video signal and audio signal decoded by the IRD 1 are supplied to a video input terminal and an audio input terminal of the television receiver 3. A reception picture plane of a desired program is displayed on the television receiver 3 and its audio sound is generated.

The digital video cassette recording/reproducing apparatus 2 can perform the digital recording and analog recording by the same tape cassette. The IRD 1 and digital video cassette recording/reproducing apparatus 2 are connected through the cable 8 of the digital interface of IEEE1394.

A video output terminal and an audio output terminal of the digital video cassette recording/reproducing apparatus 2 are connected to the video input terminal and audio input terminal of the television receiver 3 through a cable 9. An antenna terminal of the digital video cassette recording/reproducing apparatus 2 is connected to a ground wave antenna 11 through a cable 10.

In this system, the transport stream of MPEG2 based on the reception output of the digital satellite broadcast received by the IRD 1 can be recorded/reproduced by the digital video cassette recording/reproducing apparatus 2. As a recording system in this instance, the single program recording system in which the transport stream of one program is extracted from a plurality of transport streams and recorded is used.

That is, in the case where the transport stream of MPEG2 from the IRD 1 is recorded by the digital video cassette recording/reproducing apparatus 2, the video packet and audio packet of one desired program are extracted and descrambled by the IRD 1. The transport stream of MPEG2 comprising the video packet and audio packet of one desired program is outputted from the IRD 1 and sent to the digital video cassette recording/reproducing apparatus 2 through the digital interface of IEEE1394.

A recording process of the transport stream of MPEG2 comprising the video packet and audio packet of one desired program is performed by the digital video cassette recording/reproducing apparatus 2. The processed transport stream is recorded onto the tape cassette loaded in the digital video cassette recording/reproducing apparatus 2.

Upon reproduction, the tape cassette in which the transport stream of MPEG2 has been recorded by the single program recording system is loaded into the digital video cassette recording/reproducing apparatus 2 and reproduced. The reproduced transport stream of MPEG2 is sent to the IRD 1 through the digital interface of IEEE1394.

In the IRD 1, a decoding process is performed to the transport stream of MPEG2 and the video signal and audio signal of, for example, the NTSC system are demodulated. Those signals are supplied to the television receiver 3. A reception picture plane based on the transport stream of MPEG2 reproduced from the tape cassette loaded in the digital video cassette recording/reproducing apparatus 2 is displayed on the television receiver 3 and its audio sound is generated.

The digital video cassette recording/reproducing apparatus 2 can perform an analog process on the signal of the ground wave broadcast and record the processed signal onto the loaded tape cassette.

In case of analog-processing the signal of the ground wave broadcast and recording the processed signal to the tape cassette, the signal of the ground wave broadcast is received by the antenna 11 and this reception signal is supplied to a ground wave tuner circuit in the digital video cassette recording/reproducing apparatus 2. In the ground wave tuner circuit, a signal of a desired channel is selected and an analog video signal and an audio signal are demodulated from the reception signal. The analog video signal and audio signal are analog-recorded onto the tape cassette loaded in the digital video cassette recording/reproducing apparatus 2.

In case of reproducing the video cassette in which the video signal and audio signal were analog-recorded, the video cassette is loaded into the digital video cassette recording/reproducing apparatus 2 and reproduced. The reproduction signal is sent from the digital video cassette recording/reproducing apparatus 2 to the television receiver 3 through the cable 9. The reception picture plane based on the analog signal reproduced from the tape cassette is displayed on the television receiver 3 and its audio sound is generated.

As mentioned above, according to this system, the transport stream of MPEG2 from the IRD 1 can be recorded/reproduced by the digital video cassette recording/reproducing apparatus 2. As a recording system in this instance, the single program recording system for recording the transport stream comprising one program is used. However, there is a possibility that the tape cassette recorded by the multiprogram recording system for recording the transport stream comprising a plurality of programs is loaded into the digital video cassette recording/reproducing apparatus 2.

According to the embodiment of the invention, when the transport stream from the digital video cassette recording/reproducing apparatus 2 is decoded, whether the transmitted transport stream of MPEG2 is based on the single program recording system or the multiprogram recording system is discriminated. In case of the transport stream of the single program recording system, the video packet and audio packet of the program are extracted and decoded. In case of the transport stream of the multiprogram recording system, the video packet and audio packet of the program of the smallest program number among a plurality of programs are extracted and decoded. For example, in case of the streams of program Nos. "#1", "#2", and "#3", the video packet and audio packet of the program No. "#1" are extracted and decoded.

As mentioned above, when the transport stream sent from the digital video cassette recording/reproducing apparatus 2 is based on the multiprogram recording system, by decoding the program of the smallest program number among a plurality of programs, even if the tape cassette recorded by the multiprogram recording system is loaded into the digital video cassette recording/reproducing apparatus 2, the process can be performed without confusing the user.

Although the program of the smallest program number among a plurality of programs is decoded, the invention is not limited to such an example.

Figure 2:
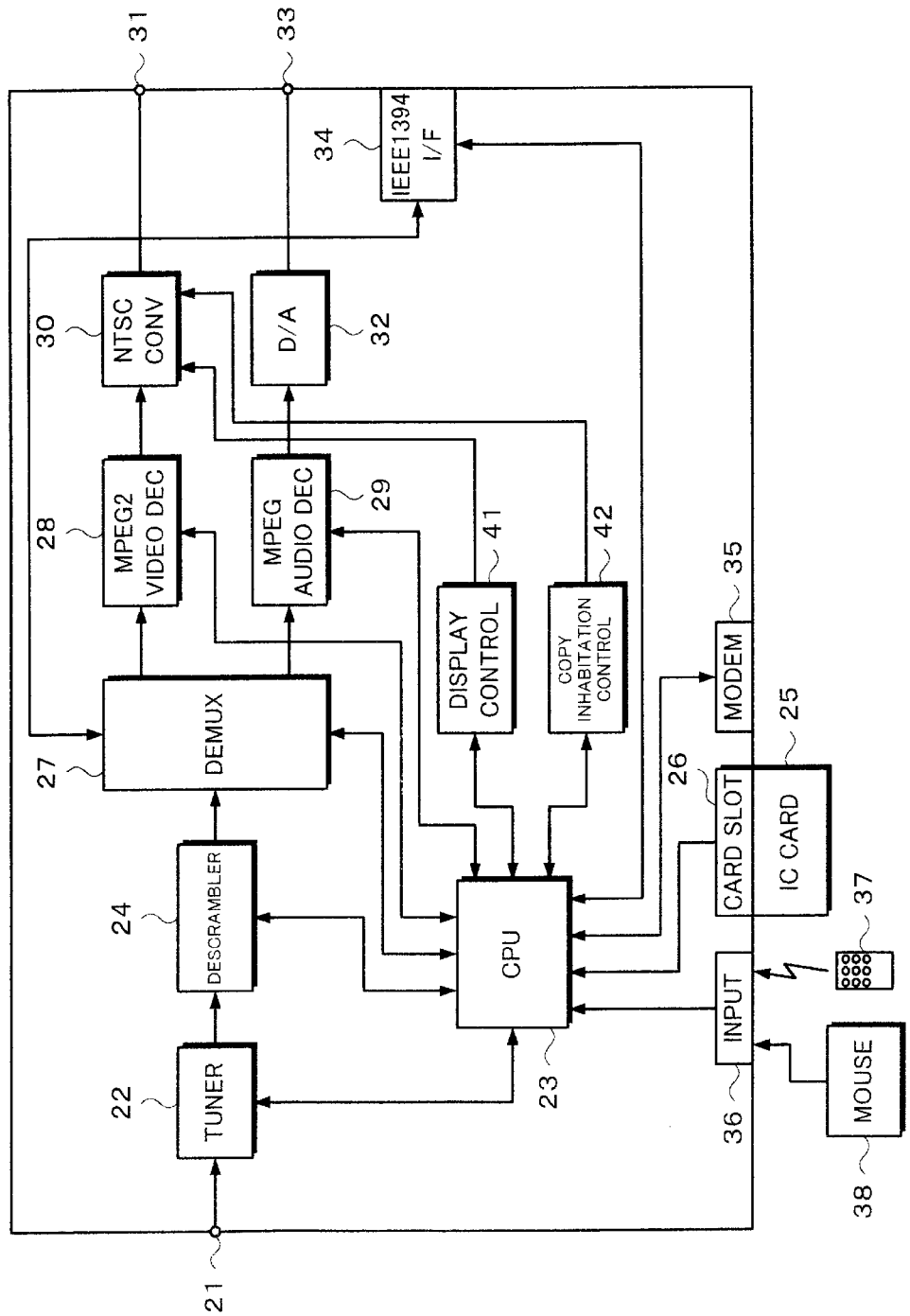
FIG. 2 is a block diagram of an example of an IRD in the receiving and recording/reproducing system of the digital satellite broadcast to which the invention is applied.

FIG. 2 shows a construction of the IRD 1. As shown in FIG. 1, the radio wave of the digital satellite broadcast transmitted through the satellite by a radio wave in a band of, for example, 12 GHz is received by the parabolic antenna 4 and converted into the signal in a band of 1 GHz by the low noise converter 5 attached to the parabolic antenna 4. An output of the low noise converter 5 is supplied to an antenna terminal 21 of the IRD 1 through the cable 6. The signal from the antenna terminal 21 is supplied to a tuner circuit 22.

The tuner circuit 22 has: a frequency selecting circuit for selecting a signal of a predetermined carrier frequency from the reception signal; a demodulating circuit for performing a QPSK (Quadrature Phase Shift Keying) demodulating process; and an error correction processing circuit. In the tuner circuit 22, the signal of a desired carrier frequency is selected from the reception signal on the basis of a set signal from a CPU (Central Processing Unit) 23 for controlling. The reception signal is QPSK (Quadrature Phase Shift Keying) demodulated and is, further, subjected to an error correcting process.

An output of the tuner circuit 22 is supplied to a descrambler 24. Received ECM (Entitlement Control Message) data and EMM (Entitlement Management Message) data are inputted to the descrambler 24 and key data for descrambling stored in an IC card 25 loaded in an IC card slot 26 is also supplied. The descrambler 24 descrambles the MPEG transport stream by using the received ECM data and EMM data and the key data of the IC card 25. The descrambled transport stream of MPEG2 is sent to a demultiplexer 27.

The demultiplexer 27 separates a desired packet from the stream from the descrambler 22 on the basis of a command from the CPU 23. In the transmission packet, a packet identifier (PID) is provided in a header portion. In the demultiplexer 27, the video packet and audio packet of a desired program are extracted on the basis of the PID. The video packet of the desired program is sent to an MPEG2 video decoder 28 and the audio packet is sent to an MPEG audio decoder 29.

The MPEG2 video decoder 28 receives the packet of the video signal from the demultiplexer 27, executes a decoding process of the MPEG2 system, and forms video data. The video data is supplied to an NTSC converting circuit 30. The video data decoded by the MPEG2 video decoder 28 is converted into the video signal of the NTSC system by the NTSC converting circuit 30.

A display control circuit 41 and a copy inhibition control circuit 42 are provided for the NTSC converting circuit 30. The display control circuit 41 generates various display picture planes onto the picture plane as necessary. The whole picture plane can be muted as necessary by the display control circuit 41. The copy inhibition control circuit 42 generates a copy inhibition control signal as necessary in order to protect a copyright of a video image.

An output of the NTSC converting circuit 30 is supplied to an analog video output terminal 31. An analog video signal of the NTSC system is outputted from the analog video output terminal 31.

The MPEG audio decoder 29 receives the audio packet from the demultiplexer 27, performs an audio decoding process of the MPEG system, and forms audio data before data compression. The decoded audio data is converted into an analog audio signal by a D/A converter 32 and, after that, supplied to an analog audio output terminal 33. The analog audio signal is outputted from the analog audio output terminal 33.

A signal to the IRD 1 is inputted from an input unit 36. A remote controller 37 and a mouse 38 are provided as an input unit 36. A modem 35 is provided and accounting information is sent to a broadcasting station or accounting center through a telephone line by the modem 35.

A carrier frequency of the reception signal is set on the basis of a channel setting signal inputted by the viewer. When it is set to a desired program, a receiving frequency of the tuner 22 is set to a predetermined carrier frequency by referring to an NIT (Network Information Table). A packet of the PID of a PMT (Program Map Table) as information regarding a desired channel is extracted with reference to a PAT (Program Association Table) as information regarding the channel at the carrier frequency. By referring to the PMT, the PID of the packet of the video image, audio sound, and additional data of a desired channel is obtained.

A digital interface 34 of IEEE1394 is provided for the IRD 1. The transport stream can be inputted/outputted between the demultiplexer 27 and the interface 34 of IEEE1394. In case of recording the transport stream of MPEG2 by the digital video cassette recording/reproducing apparatus 2, the video packet and audio packet of a desired program are extracted by the demultiplexer 27. The transport stream of MPEG2 comprising the video packet and audio packet of the desired program is sent from the demultiplexer 27 to the digital video cassette recording/reproducing apparatus 2 through the digital interface 34 of IEEE1394.

In case of decoding the transport stream of MPEG2 reproduced by the digital video cassette recording/reproducing apparatus 2, the transport stream of MPEG2 reproduced by the digital video cassette recording/reproducing apparatus 2 is inputted through the digital interface 34 of IEEE1394 and sent to the demultiplexer 27. The video packet and audio packet are separated from the transport stream of MPEG2 by the demultiplexer 27. The video packet is sent to the MPEG2 video decoder 28 and decoded. The audio packet is sent to the MPEG audio decoder 29 and decoded.

Figure 3:
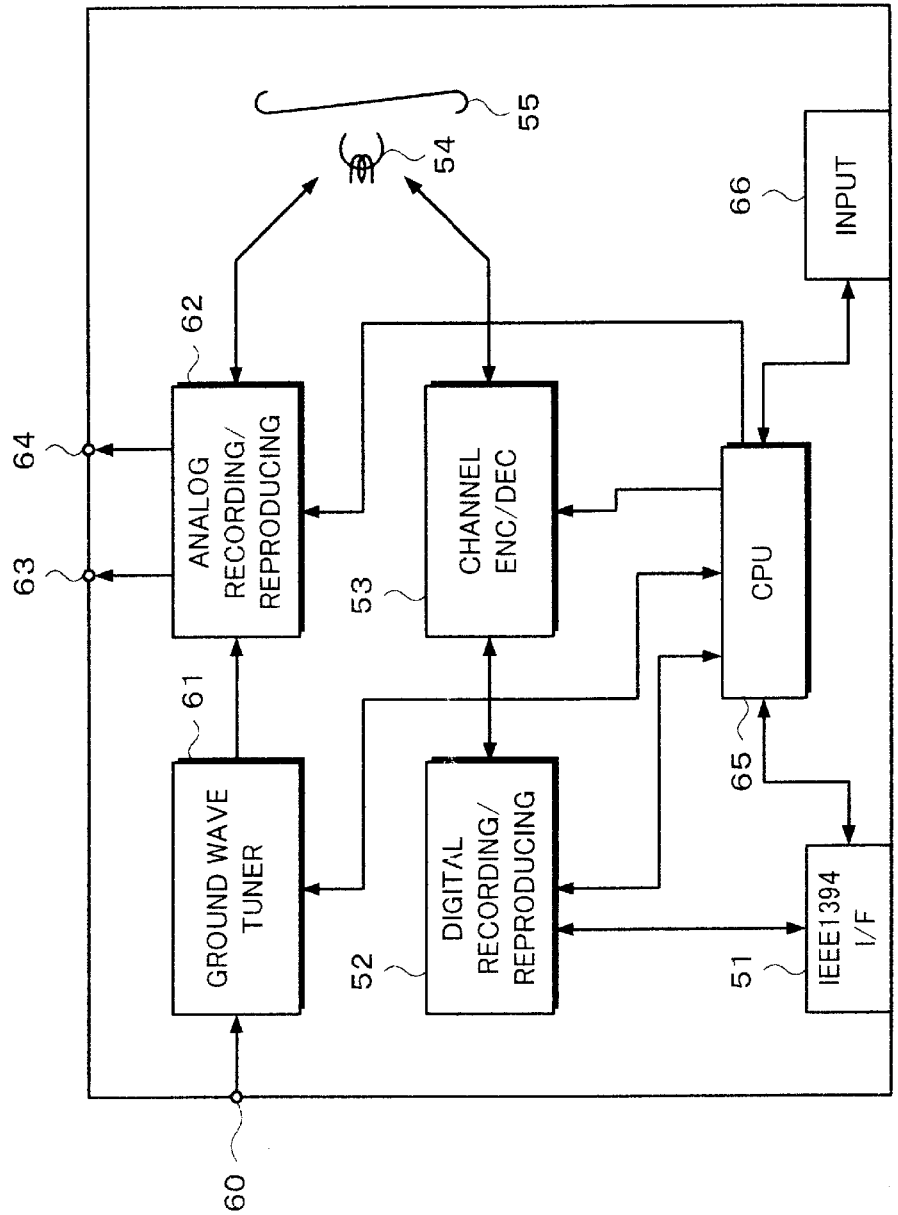
FIG. 3 is a block diagram of an example of a digital video cassette recording/reproducing apparatus in the receiving and recording/reproducing system of the digital satellite broadcast to which the invention is applied.

FIG. 3 shows a construction of the digital video cassette recording/reproducing apparatus 2. As mentioned above, the digital video cassette recording/reproducing apparatus 2 can perform the digital recording/reproduction and analog recording/reproduction. To perform the digital recording/reproduction, a digital recording/reproducing circuit 52 and a channel encoder/decoder 53 are provided. To perform the analog recording/reproduction, an analog recording/reproducing circuit 62 is provided.

The control of the recording/reproducing apparatus 2 is performed by a CPU 65. Inputs to perform various operations are supplied from an input unit 66.

In case of recording the transport stream from the IRD 1, the transport stream of MPEG2 from the IRD 1 is inputted through a digital interface 51 of IEEE1394. The transport stream of MPEG2 is supplied to the digital recording/reproducing circuit 52. In the digital recording/reproducing circuit 52, an error correction encoding process is performed to the data of the transport stream. An output of the digital recording/reproducing circuit 52 is supplied to the channel encoder/decoder 53 and modulated. An output of the channel encoder/decoder 53 is supplied to a head 54. The transport stream from the IRD 1 is, consequently, recorded onto a tape 55 of the tape cassette loaded in the digital video cassette recording/reproducing apparatus 2.

In case of reproducing the tape cassette in which the transport stream of MPEG2 has been recorded, a reproduction signal of the tape 55 is reproduced by the head 54 and an output of the head 54 is supplied to the channel encoder/decoder 53 and demodulated. An output of the channel encoder/decoder 53 is supplied to the digital recording/reproducing circuit 52. An error correcting process is performed in the digital recording/reproducing circuit 52. An output of the digital recording/reproducing circuit 52 is supplied to the demultiplexer 27 of the IRD 1 through the digital interface 51 of IEEE1394.

The video packet and audio packet are separated from the transport stream by the demultiplexer 27 (FIG. 2) of the IRD 1. The video packet is decompressed by the MPEG2 video decoder 28, converted into the video signal of the NTSC system by the NTSC converting circuit 30, and sent from the video output terminal 31 to the television receiver 3. The audio packet is decompressed by the MPEG audio decoder 29, converted into an analog signal by the D/A converter 32, and sent from the audio output terminal 33 to the television receiver 3.

In FIG. 3, in case of analog-recording the ground wave broadcasting, the reception signal of the ground wave is supplied to an antenna input terminal 60 and the signal from the antenna input terminal 60 is supplied to a ground wave tuner circuit 61. A reception signal of a desired broadcast is selected by the ground wave tuner circuit 61 and analog video signal and audio signal of, for example, the NTSC system are demodulated from the reception signal. The analog video signal and analog audio signal are supplied to the analog recording/reproducing circuit 62. A recording process of the video signal and audio signal is performed in the analog recording/reproducing circuit 62. That is, a luminance signal is frequency modulated, a chroma signal is converted into a low band frequency, and the audio signal is frequency modulated. Those signals are multiplexed and the multiplexed signal is supplied to the head 54. The analog video signal and audio signal are recorded onto the tape 55 of the loaded tape cassette by the head 54.

In case of reproducing the analog-recorded tape cassette, the signal of the tape 55 is reproduced by the head 54 and supplied to the analog recording/reproducing circuit 62. A reproducing process of the video signal and audio signal of the NTSC system is performed in the analog recording/reproducing circuit 62. That is, a frequency modulation luminance signal, a low band conversion chroma signal, and frequency modulation audio signal are extracted from the reproduction signal. A frequency demodulating process is performed to the frequency modulation luminance signal and the luminance signal is demodulated. The low band conversion chroma signal is returned to the chroma signal of a carrier frequency of 3.58 MHz. The video signal of the NTSC system is formed from the luminance signal and chroma signal. A frequency demodulating process is performed to the frequency modulation audio signal and the audio signal is demodulated. The video signal and audio signal are outputted from a video output terminal 63 and an audio output terminal 64.

According to the embodiment of the invention, when the transport stream reproduced by the digital video cassette recording/reproducing apparatus 2 is decoded, whether the transmitted transport stream is based on the single program recording system or the multiprogram recording system is discriminated in the IRD 1. In case of the transport stream of the single program recording system, the audio packet and video packet of the program are extracted and decoded. In case of the transport stream of the multiprogram recording system, the video packet and audio packet of the program of the smallest program number among a plurality of programs are extracted and decoded. Thus, when the tape cassette recorded by the multiprogram recording system is loaded into the digital video cassette recording/reproducing apparatus 2 and reproduced, even if the transport stream of MPEG2 is inputted to an IRD which does not support the multiprogram recording system, the user can cope with such a situation without being confused.

Figure 4:
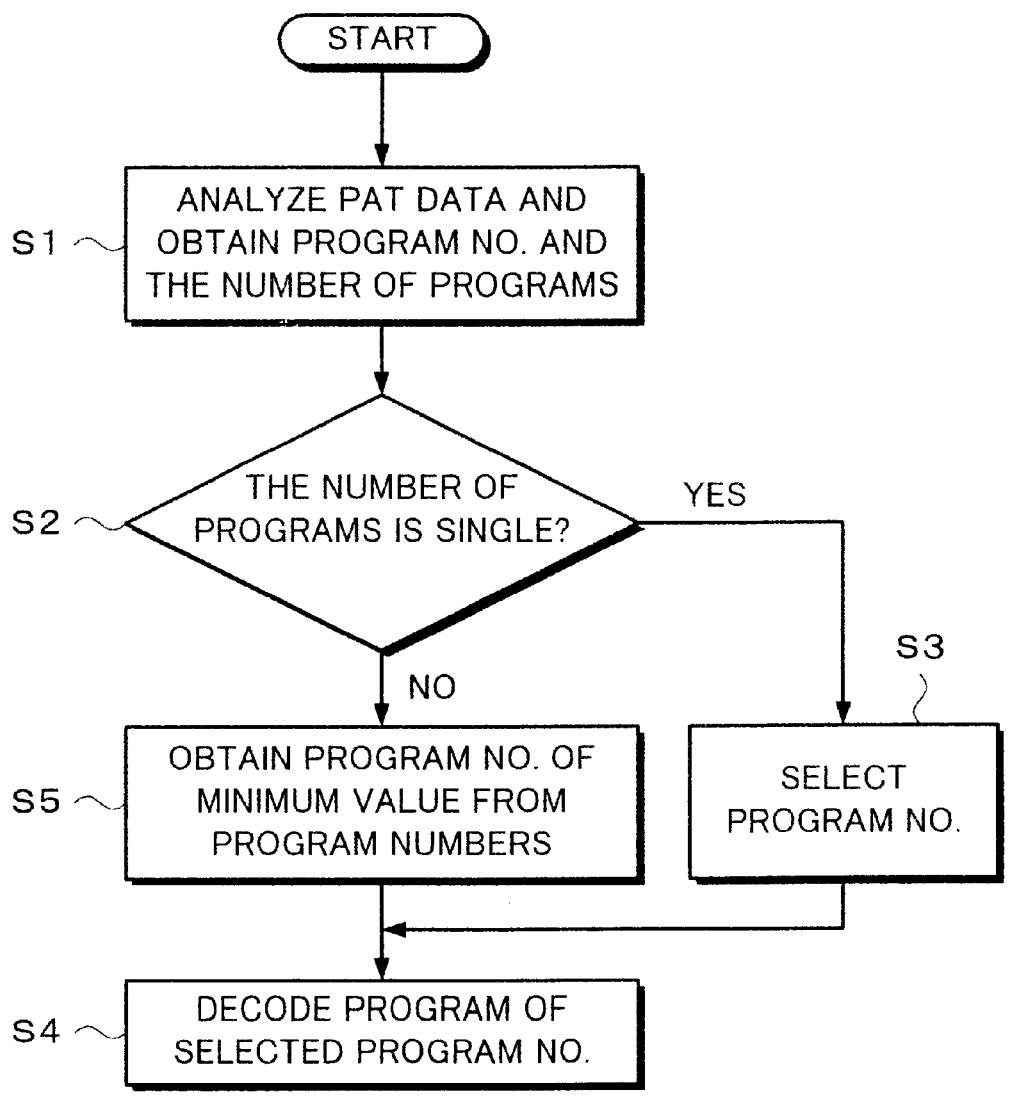
FIG. 4 is a flowchart for use in the explanation of an example of processes in the case where a transport stream of a multiprogram recording system is sent.

FIG. 4 is a flowchart showing processes of the demultiplexer 27 in this instance. As shown in FIG. 4, the transport stream sent from the digital video cassette recording/reproducing apparatus 2 is first demultiplexed by the demultiplexer 27, the PID is extracted, and the PAT is analyzed. The program numbers of the programs which are sent by the stream and the number of programs are obtained from the information of the PAT (step S1).

A check is made to see if the number of programs is a single number from the information of the PAT (step S2). If YES, the recording system is decided to be the single program recording system and the program number is selected (step S3). The video packet and audio packet of the program number are obtained and a decoding process is performed (step S4).

If the number of programs is not a single number, the program number of the minimum value among the program numbers is selected (step S5). The video packet and audio packet of the program number are obtained and a decoding process is performed (step S4).

As mentioned above, correspondence information of the program number of the program which is transmitted by the transport stream and the PID of the PMT regarding it is shown in the PAT. Therefore, whether the transport stream is based on the multiprogram recording system or the single program recording system can be discriminated from the information of the PAT. Whether the number of programs is a single number or not can be discriminated by the CPU 23 from the information of the PAT.

In the above embodiment, in case of the transport stream of the multiprogram recording system, the video packet and audio packet of the program of the smallest program number among a plurality of programs are extracted and decoded. However, in case of the transport stream of the single program recording system, the video image can be muted without decoding the program.

Figure 5:
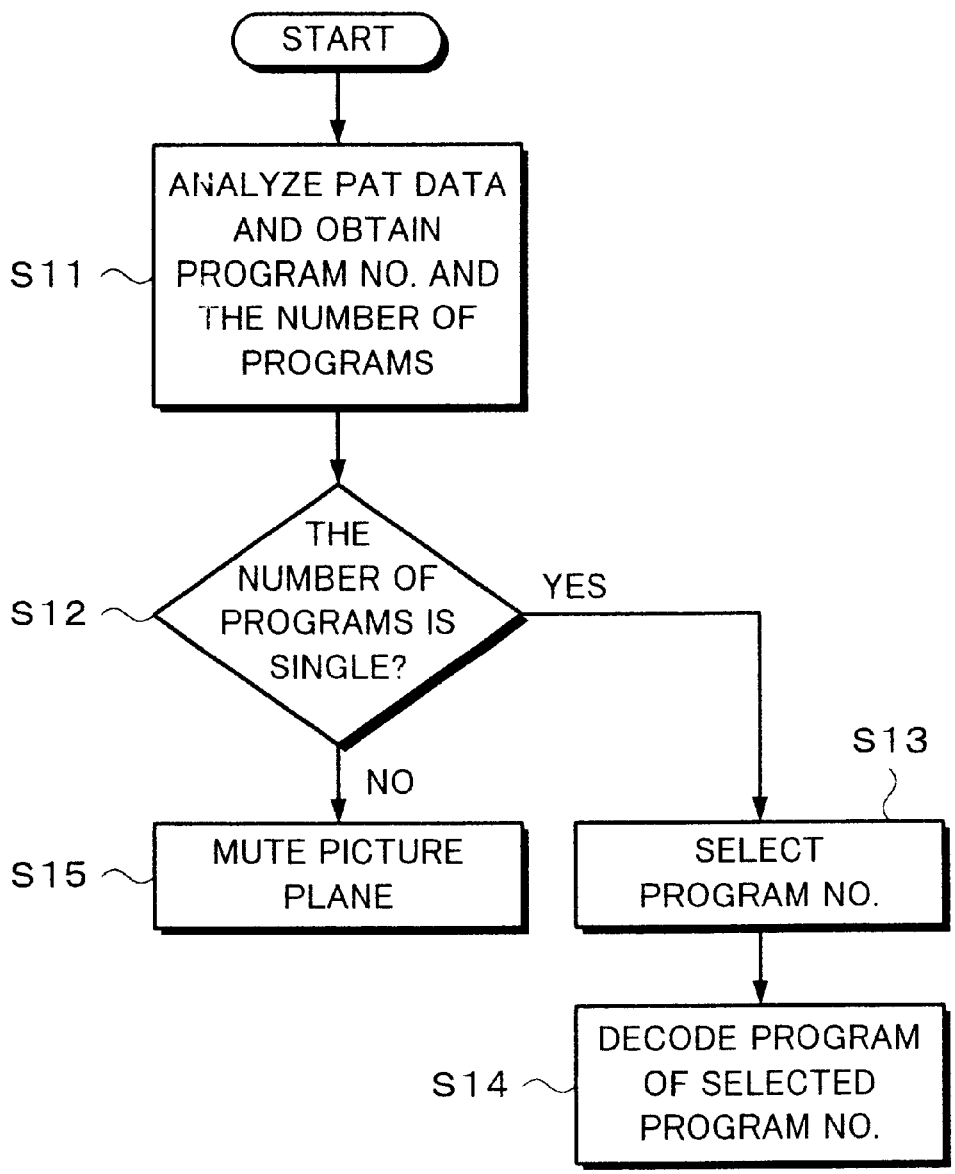
FIG. 5 is a flowchart for use in the explanation of another example of processes in the case where the transport stream of the multiprogram recording system is sent.

That is, as shown in FIG. 5, the PAT is analyzed and the program numbers of the programs which are sent by the stream and the number of programs are obtained from the information of the PAT (step S11). Whether the number of programs is a single number or not is discriminated from the information of the PAT (step S12). If the number of programs is a single number, it is determined that the recording system is the single program recording system, and the program number is selected (step S13). The video packet and audio packet of the program of the program number are obtained and a decoding process is performed (step S14). If the number of programs is not equal to a single number, a muting signal is generated from the display control circuit 41 by a command from the CPU 23 (step S14). Thus, the video signal is muted. In this instance, the audio sound can be also muted.

Figure 6:
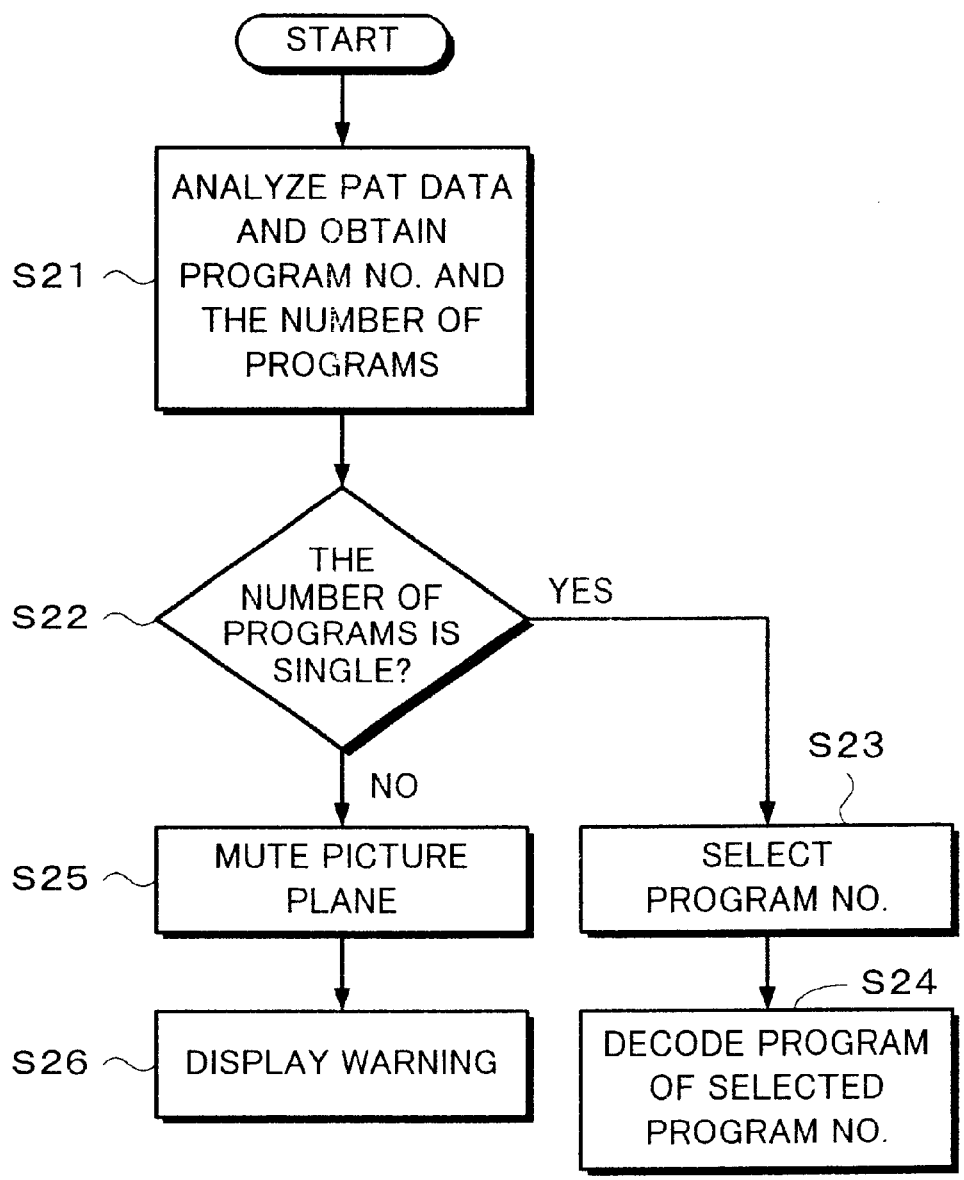
FIG. 6 is a flowchart for use in the explanation of still another example of processes in the case where the transport stream of the multiprogram recording system is sent.

Further, a message indicating that the program cannot be reproduced in case of the transport stream of the multiprogram recording system can be displayed. That is, as shown in FIG. 6, the PAT is analyzed and the program numbers of the programs which are transmitted by the stream and the number of programs are obtained from the information of the PAT (step S21). Whether the number of programs is a single number or not is discriminated from the information of the PAT (step S22). If the number of programs is a single number, it is determined that the recording system is the single program recording system, and the program number is selected (step S23). The video packet and audio packet of the program of the program number are obtained and a decoding process is performed (step S24). If the number of programs is not equal to a single number, the picture plane is muted by a command from the CPU 23 (step S25). A display signal indicating "the program cannot be reproduced because the transport stream is based on the multiprogram recording system" is generated (step S26). Thus, a warning is displayed on the picture plane. Whether the number of programs is a single number or not can be discriminated by the CPU 23 on the basis of the information of the PAT.

Although the embodiment has been described with respect to the case where the transport stream of MPEG2 from the IRD 1 is recorded/reproduced by the digital video cassette recording/reproducing apparatus 2, the transport stream of MPEG2 from the IRD 1 can be also recorded/reproduced by a recording/reproducing apparatus of a DVD, a CD-R, a hard disk, or the like.

The present invention is not limited to the foregoing embodiments but many modifications and variations are possible within the spirit and scope of the appended claims of the invention.

What is claimed is:

1. A receiving apparatus for a digital broadcast signal, comprising:

a tuner operable to select a desired transmission channel over which to receive the digital broadcast signal and demodulate a transport stream which is transmitted over said selected transmission channel;

a demultiplexer operable to extract a desired program from said demodulated transport stream;

an interface operable to transmit said demodulated transport stream to, and receive a reproduced transport stream from, a reproducing apparatus; and a discriminator operable to determine whether said reproduced transport stream from said reproducing apparatus contains a multiplexed plurality of programs, and said demultiplexer being incapable of extracting a user selected one of said multiplexed plurality of programs from said reproduced transport stream, wherein a predetermined process of program selection is performed on said reproduced transport stream to automatically select only one of said multiplexed plurality of programs when said discriminator determines that said reproduced transport stream contains said multiplexed plurality of programs.

2. An apparatus according to claim 1, wherein said discriminator is operable to analyze a predetermined table in said reproduced transport stream and to obtain a value representing a number of said multiplexed plurality of programs in said reproduced transport stream to determine whether said reproduced transport stream contains said multiplexed plurality of programs.

3. An apparatus according to claim 1, wherein said discriminator is operable to analyze a predetermined table in said reproduced transport stream and to obtain program identification numbers of said multiplexed plurality of programs in said reproduced transport stream to determine whether said reproduced transport stream contains said multiplexed plurality of programs.

4. An apparatus according to claim 3, wherein said predetermined process includes selecting one program identification number among said program identification numbers and extracting a program corresponding to said selected program identification number using said demultiplexer.

5. An apparatus according to claim 4, wherein said selected program identification number is a smallest one of said program identification numbers.

6. An apparatus according to claim 1, wherein said interface is connected to said demultiplexer.

7. A method of processing a transport stream in a receiving apparatus incapable of allowing user selection of one of a plurality of programs of a multiprogram recording, said transport stream being received from a reproducing apparatus, comprising:

determining whether or not said transport stream received from said reproducing apparatus contains a multiplexed plurality of programs; and performing a predetermined process of program selection to said transport stream to automatically select one of said multiplexed plurality of programs when it is determined that said transport stream received from said reproducing apparatus contains said multiplexed plurality of programs.

8. A method according to claim 7, wherein said selected program has a smallest program identification number among said multiplexed plurality of programs.

9. A receiving apparatus, comprising:

a decoder operable to decode data from a program of a transport stream received from a digital broadcast signal;

an interface operable to receive a reproduced transport stream from a reproducing apparatus; and a discriminator operable to determine whether said reproduced transport stream from said reproducing apparatus contains a multiplexed plurality of programs, and said decoder being incapable of decoding a user selected one of a plurality of programs of a multiprogram recording, wherein a predetermined process of program selection is performed on said reproduced transport stream to automatically select only one of said multiplexed plurality of programs when said discriminator determines that said reproduced transport stream contains said multiplexed plurality of programs.

10. An apparatus according to claim 9, wherein said discriminator is operable to analyze a predetermined table in said reproduced transport stream and to obtain a value representing a number of said multiplexed plurality of programs in said reproduced transport stream to determine whether said reproduced transport stream contains said multiplexed plurality of programs.

11. An apparatus according to claim 9, wherein said discriminator is operable to analyze a predetermined table in said reproduced transport stream and to obtain program identification numbers of said multiplexed plurality of programs in said reproduced transport stream to determine whether said reproduced transport stream contains said multiplexed plurality of programs.

12. An apparatus according to claim 11, wherein said predetermined process includes selecting one program identification number among said program identification numbers and decoding a program corresponding to said selected program identification number.

13. An apparatus according to claim 12, wherein said selected program identification number is a smallest one of said program identification numbers.

14. An apparatus according to claim 9, wherein said predetermined process includes disabling said decoder when said discriminator determines that said reproduced transport stream contains said multiplexed plurality of programs.

15. An apparatus according to claim 14, wherein said predetermined process further includes outputting a warning display on an external device.

16. An apparatus according to claim 14, wherein said predetermined process includes muting at least one of a video signal and an audio signal which have been decoded from said reproduced transport stream.

17. A method of processing a transport stream in a receiving apparatus incapable of allowing user selection of one of a plurality of programs of a multiprogram recording, the receiving apparatus for receiving a digital broadcast signal and a transport stream from a reproducing apparatus, comprising:

determining whether or not said transport stream received from said reproducing apparatus contains a multiplexed plurality of programs; and muting at least one of a video signal and an audio signal when it is determined that said reproduced transport stream from said reproducing apparatus contains said multiplexed plurality of programs.

18. A method of processing a transport stream in a receiving apparatus incapable of allowing user selection of one of a plurality of programs of a multiprogram recording, the receiving apparatus for receiving a digital broadcast signal and a transport stream from a reproducing apparatus, comprising:

determining whether or not said transport stream received from said reproducing apparatus contains a multiplexed plurality of programs; and outputting a warning display on an external device when it is determined that said reproduced transport stream from said reproducing apparatus contains said multiplexed plurality of programs.

19. A receiving apparatus, comprising:

a decoder operable to decode data from a program of a transport stream received from a digital broadcast signal and from a reproducing apparatus, said decoder being incapable of decoding a user selected one of a plurality of programs of a multiprogram recording;

an interface operable to receive a reproduced transport stream from the reproducing apparatus; and a microprocessor operable to determine whether said reproduced transport stream from said reproducing apparatus contains a multiplexed plurality of programs, wherein a predetermined process of disabling is performed to disable said decoder when said microprocessor determines that said reproduced transport stream contains said multiplexed plurality of programs.

20. An apparatus according to claim 19, wherein said predetermined process further includes outputting a warning display on an external device.

21. An apparatus according to claim 20, wherein said predetermined process further includes muting at least one of a video signal and an audio signal produced by said decoding unit.

* * * * *

UNITED STATES PATENT AND TRADEMARK OFFICE
CERTIFICATE OF CORRECTION

PATENT NO.    : 6,671,290 B1
DATED         : December 30, 2003
INVENTOR(S)   : Naoki Murayama et al.

It is certified that error appears in the above-identified patent and that said Letters Patent is hereby corrected as shown below:

Column 2,
Line 15, "cosidered," should read -- considered --.
Line 45, delete the word "such".
Line 55, delete the word "with".

Column 12,
Line 62, "20" should read -- 19 --

Signed and Sealed this

Twenty-ninth Day of June, 2004

JON W. DUDAS
*Acting Director of the United States Patent and Trademark Office*